(12) United States Patent
Loughry et al.

(10) Patent No.: US 9,547,532 B2
(45) Date of Patent: Jan. 17, 2017

(54) TECHNIQUES TO PROVIDE PROXIES FOR WEB SERVICES

(75) Inventors: Michael Loughry, Kirkland, WA (US); Elroy Dyksen, Redmond, WA (US); Robert Congdon, Redmond, WA (US); Edward Banti, Seattle, WA (US); Kumarswamy Valegerepura, Washington, WA (US); Ilya Smirnov, Redmond, WA (US); Selvaraj Nalliah, Redmond, WA (US); Harvey Rook, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 13/353,718

(22) Filed: Jan. 19, 2012

(65) Prior Publication Data
US 2013/0191509 A1 Jul. 25, 2013

(51) Int. Cl.
*G06F 9/54* (2006.01)
(52) U.S. Cl.
CPC ..................... *G06F 9/541* (2013.01)
(58) Field of Classification Search
CPC ........... G06F 17/00; G06F 15/16; G06F 9/541
USPC ........................................................ 709/219
See application file for complete search history.

(56) References Cited

U.S. PATENT DOCUMENTS

| 7,870,482 | B2 | 1/2011 | Gnech et al. | |
|---|---|---|---|---|
| 8,190,675 | B2 * | 5/2012 | Tribbett | 709/203 |
| 2004/0215665 | A1 * | 10/2004 | Edgar et al. | 707/200 |
| 2008/0027988 | A1 * | 1/2008 | Regnier | 707/104.1 |
| 2011/0161465 | A1 | 6/2011 | Kowalski | |
| 2012/0197963 | A1 * | 8/2012 | Bouw et al. | 709/202 |

OTHER PUBLICATIONS

International Conference on Computing in High Energy and Nuclear Physics (CHEP'07) IOP Publishing Journal of Physics: Conference Series 119 (2008) 062017 doi:10.1088/1742-6596/119/6/062017.*
NPL2 (Title: The gSOAP Toolkit for Web Services and Peer-To-Peer Computing Networks; by Van Engelen et al, IEEE proceedings; 2002).*
"Stand-Alone JSON Serialization", Retrieved at<<http://msdn.microsoft.com/en-us/library/bb412170.aspx>>, Retrieved Date Jul. 21, 2011, pp. 13.

(Continued)

*Primary Examiner* — Jerry Dennison
(74) *Attorney, Agent, or Firm* — Anand Gupta; Geraldine R. McMiller; Micky Minhas

(57) ABSTRACT

Techniques to provide proxies for web services are described. A technique may include providing proxies for web services that translate one format to a format native used, or understood, by the web service without having to rewrite existing APIs. In one embodiment, for example, an apparatus may comprise a processing unit and a network interface coupled to the processing unit. The apparatus may further include a web service executing web service requests on the processing unit using a native format. The apparatus may further include a proxy to receive a web service request in a first format via the network interface and to translate the web service request from the first format to the native format. Other embodiments are described and claimed.

13 Claims, 10 Drawing Sheets

(56) References Cited

OTHER PUBLICATIONS

Mainer, Michael, "Generating Exchange Web Services Proxy Classes", Retrieved at <<http://blogs.msdn.com/b/exchangedev/archive/2007/12/07/generating-exchange-web-services-proxy-classes.aspx>>Retrieved Date Jul. 2, 2011, pp. 4.

Aziz, et al., "SAn Introduction to JavaScript Object Notation (JSON) in JavaScript and .NET", Retrieved at<<http://msdn.microsoft.com/en-us/library/bb299886.aspx>> Feb. 2007, p. 19.

"Asp.net Application Services Overview", Retrieved at <<http://msdn.microsoft.com/en-us/library/bb547119.aspx>> Retrieved Date Jul. 21, 2011, pp. 7.

"Microsoft asp.net 3.5: Web Services for asp.net AJAX Applications (part 1)—Remote Calls via Web Services", Retrieved at http://mscerts.programming4.us/programming/Microsoft%20ASP_NET%203_5%20%20%20Web%20Services%20for%20ASP_NET%20AJAX%20Applications%20(part%201)%20-%20Remote%20Calls%20via%20Web%20Services.asp>> Retrieved Date Jul. 21, 2011, pp. 7.

* cited by examiner

```
{
 "_type":"GetItemJsonRequest:#Exchange",
 "Header":{
   "_type":"JsonRequestHeaders:#Exchange","TimeZoneContext":{
     "_type":"TimeZoneContext:#Exchange","TimeZoneDefinition":{  502
       "_type":"TimeZoneDefinitionType:#Exchange",
       "Id":"Pacific Standard Time"     504
     }},
   "RequestServerVersion":"Exchange2012"
 },
 "Body":{
   "_type":"GetItemRequest:#Exchange","ItemIds":[{
     "_type":"ItemId:#Exchange",
     "ChangeKey":"DwAAABYAAACxjKHJha2yTKYahK6F/hTdAAAAKN3Z5",
     "Id":"AQMkAGI3MDViMTUxLWVjZDUtNDFmNnkaesJK35bjoOwcAL7+YEAAAAGaAAAAGCtLCfQAI+bd1owAAAA=="
   }],
   "ItemShape":{
     "_type":"ItemResponseShape:#Exchange",
     "BaseShape":"IdOnly","AdditionalProperties":[{
       "_type":"PropertyUri:#Exchange",
       "FieldURI":"ConflictingMeetingCount"
     },
     {
       "_type":"PropertyUri:#Exchange",
       "FieldURI":"AdjacentMeetingCount"
     }]}}}
```

```
{
"__type":"FindItemJsonRequest:#Exchange",
"Header":{
    "__type":"JsonRequestHeaders:#Exchange","TimeZoneContext":{
    "__type":"TimeZoneContext:#Exchange","TimeZoneDefinition":{      602
    "__type":"TimeZoneDefinitionType:#Exchange",
        "Id":"Pacific Standard Time"
}},                                                                  604
"RequestServerVersion":"Exchange2012"},
"Body":{
    "__type":"FindItemRequest:#Exchange","Paging":{
    "__type":"CalendarPageView:#Exchange",
        "EndDate":"2011-12-07T00:00:00.000",
        "StartDate":"2011-12-06T00:00:00.001"
            },
"ParentFolderIds":[{
"__type":"FolderId:#Exchange",
"Id":"AQMkAGI3MDViMTUxLWVjZDUtNDFmMmRILTRjMGQ5ZmFmZDNk"}],
"Traversal":"Shallow","ItemShape":{
    "__type":"ItemResponseShape:#Exchange",
    "BaseShape":"IdOnly","AdditionalProperties":[{
        "__type":"PropertyUri:#Exchange",
            "FieldURI":"ItemParentId"},{
        "__type":"PropertyUri:#Exchange","FieldURI":"Sensitivity"},{
        "__type":"PropertyUri:#Exchange","FieldURI":"IsCancelled"},{
        "__type":"PropertyUri:#Exchange",
            "FieldURI":"LegacyFreeBusyStatus"},{
        "__type":"PropertyUri:#Exchange","FieldURI":"CalendarItemType"},{
        "__type":"PropertyUri:#Exchange","FieldURI":"Start"},{
        "__type":"PropertyUri:#Exchange","FieldURI":"End"},{
        "__type":"PropertyUri:#Exchange","FieldURI":"MyResponseType"},{
        "__type":"PropertyUri:#Exchange","FieldURI":"IsAllDayEvent"},{
        "__type":"PropertyUri:#Exchange","FieldURI":"Location"},{
        "__type":"PropertyUri:#Exchange","FieldURI":"Organizer"},{
        "__type":"PropertyUri:#Exchange",
            "FieldURI":"AppointmentReplyTime"},{
        "__type":"PropertyUri:#Exchange","FieldURI":"Subject"},{
        "__type":"PropertyUri:#Exchange","FieldURI":"IsMeeting"},{
        "__type":"PropertyUri:#Exchange","FieldURI":"UID"}]}}}
```

*FIG. 6*

```
{
  "__type":"UpdateItemJsonRequest:#Exchange",
  "Header":{
    "__type":"JsonRequestHeaders:#Exchange","TimeZoneContext":{        ⎫
      "__type":"TimeZoneContext:#Exchange","TimeZoneDefinition":{      ⎬ 702
      "__type":"TimeZoneDefinitionType:#Exchange","Id":"Pacific Standard Time"}}, ⎭
    "RequestServerVersion":"Exchange2012"},
  "Body":{                                                             704
    "__type":"UpdateItemRequest:#Exchange","ItemChanges":[{            ⎫
      "__type":"ItemChange:#Exchange","Updates":[{                     ⎬
        "__type":"SetItemField:#Exchange","Path":{                     ⎭
          "__type":"PropertyUri:#Exchange","FieldURI":"IsRead"},
        "Item":{
          "__type":"Message:#Exchange","IsRead":true}}],
      "ItemId":{
        "__type":"ItemId:#Exchange",
        "ChangeKey":"CQAAABYAAACxjKHJha2yTKYahK6F/hTdAAAKN2bO",
        "Id":"AAMkAGI3MDViMTUxLWVjZDUtNDFmMC1iMmRwkrfluOg7BwAvv5j8eFLKIzgyAAA="
      }
    }],
    "ConflictResolution":"AlwaysOverwrite",
    "MessageDisposition":"SaveOnly",
    "SendCalendarInvitationsOrCancellations":"SendToNone"
  }
}
```

Receive a web services request in a first format.

802

Translate the request from the first format to a format native to the web services.

804

Process the request in the native format.

806

Translate request response to the first format.

808

Transmit the response to the requesting client.

TECHNIQUES TO PROVIDE PROXIES FOR WEB SERVICES

BACKGROUND

Many web services support Simple Object Access Protocol (SOAP), an XML-based protocol for programmatically issuing requests to, and receiving responses from, client applications. A web service server may provide various application program interfaces (APIs) via the SOAP protocol. The SOAP protocol is very robust but may be computationally and/or resource expensive to parse by web clients built using other protocols, such as JavaScript. It is with respect to these and other considerations that the present improvements have been needed.

SUMMARY

This Summary is provided to introduce a selection of concepts in a simplified form that are further described below in the Detailed Description. This Summary is not intended to identify key features or essential features of the claimed subject matter, nor is it intended as an aid in determining the scope of the claimed subject matter.

Various embodiments are generally directed to techniques to provide proxies for web services. Some embodiments are particularly directed to techniques to provide proxies for web services that translate one format to a format native used, or understood, by the web service without having to rewrite existing APIs. In one embodiment, for example, an apparatus may comprise a processing unit and a network interface coupled to the processing unit. The apparatus may further include a web service executing web service requests on the processing unit using a native format. The apparatus may further include a proxy to receive a web service request in a first format via the network interface and to translate the web service request from the first format to the native format. Other embodiments are described and claimed.

These and other features and advantages will be apparent from a reading of the following detailed description and a review of the associated drawings. It is to be understood that both the foregoing general description and the following detailed description are explanatory only and are not restrictive of aspects as claimed.

BRIEF DESCRIPTION OF THE DRAWINGS

FIG. 5 illustrates an example of a JSON GET request according to embodiments.

FIG. 6 illustrates an example of a JSON FINDITEM request according to embodiments.

FIG. 7 illustrates an example of a JSON UPDATE ITEM request according to embodiments.

FIG. 8 illustrates an embodiment of a logic flow for providing a proxy to a web service.

DETAILED DESCRIPTION

Figure 1:
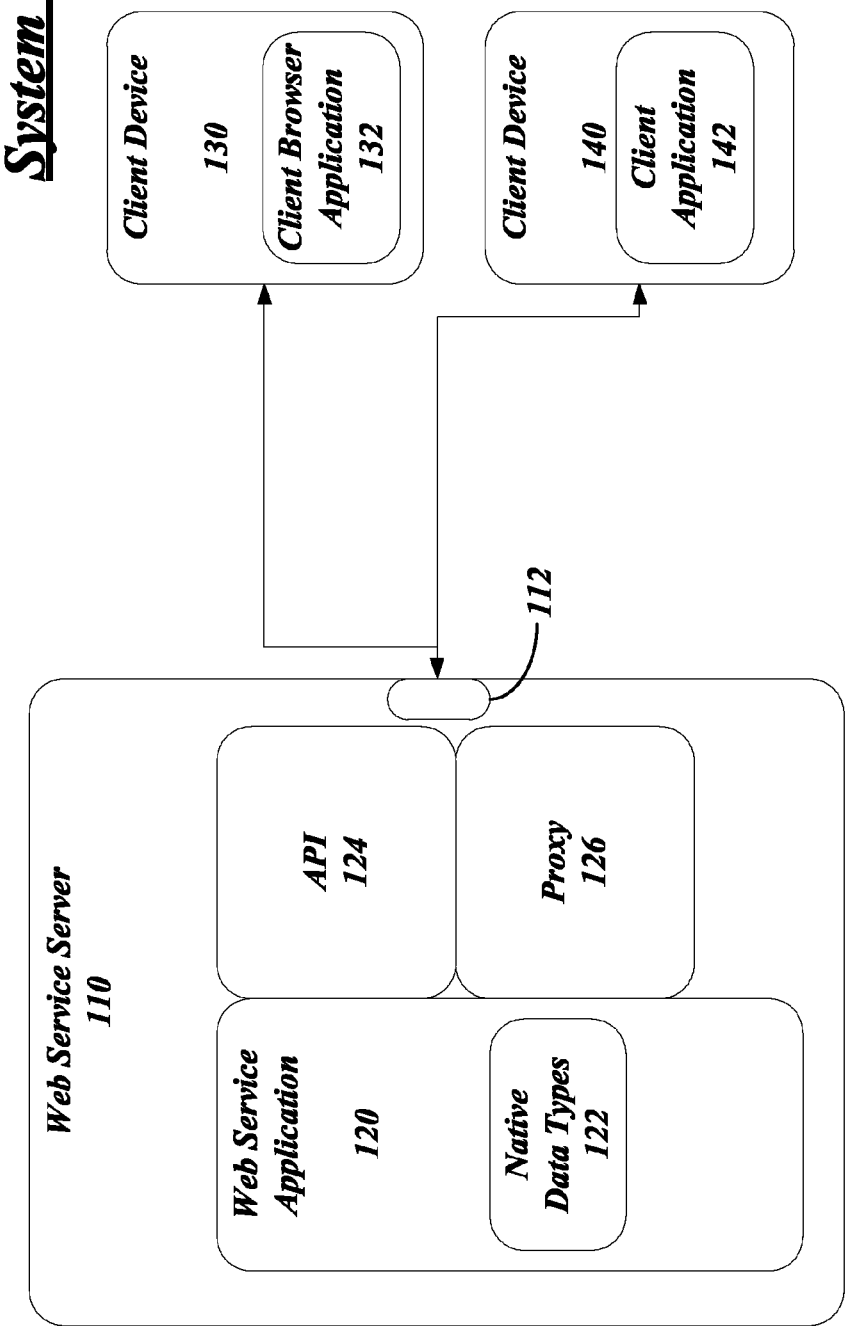
FIG. 1 illustrates an embodiment of a first system for providing a proxy to a web service.

Many web client applications are written in the Java or JavaScript programming languages. Many web services communicate using more complicated protocols, such as simple object access protocol (SOAP). Many web services may provide their own application program interfaces (APIs), and may have proprietary data types. Web clients of these web services may need a more lightweight protocol and data format for communicating. Those providing the web services may not wish to re-write all of the existing SOAP APIs to support a new protocol and data format.

One attempt to communicate between web clients and web services that use SOAP is a communications protocol referred to as "SOAPjr." SOAPjr provides JSON data structures that are designed to be sent over the hypertext protocol (HTTP), without using XML. A SOAPjr request message may include an HTTP request "envelope", a parameter named "json" which contains the bulk of the message itself and then other related parameters. In a SOAPjr request message, the "json" parameter contains a MIME-like Object-style (MOBject) JSON data structure, e.g. {"HEAD":{ },"BODY":{ }}, that represents the SOAPjr message itself. There may only be one of these per request. In a SOAPjr request message, the head part of the data structure contains a named value "service_type" that represents the service or object type described by the message. The head part also contains a named value "action_type" that represents the action that the message describes. A SOAPjr request message head part may optionally contain a named value "dmd" that contains a uniform resource locator (URL) that returns a data model definition to which the "body" part is to conform. A SOAPjr request message head part may optionally contain a named value "sid" that contains a session ID for use in authorization and authentication. See, SOAPjr Draft Specification Overview, http://soapjr.org/specs.html, Dec. 8, 2011.

In light of these issues, embodiments may include a proxy that takes in web service requests from a web client and translates the request into native data types used by the web services server. The proxy may also work in reverse, taking responses from the web service server and translating them into the format used by the web client. An embodiment allows an existing set of SOAP web service interfaces to communicate with a web client that sends and receives JavaScript Object Notation (JSON) requests and responses, without requiring any changes to the existing SOAP web services. Various embodiments introduce several header elements to a JSON request that may be particularly suited for interactions with an e-mail web service.

Various embodiments are directed to techniques to provide proxies for web services so that the web service may receive a request from a client in a first format different from the format native to the web service. The request in the first format may be translated to a second format native to the web service. The web service may then process the request and generate a response in the native format. The response may be translated from the native format to the first format, and provided to the client. As a result, the embodiments can extend the ability to offer web services to additional types of clients.

FIG. 1 illustrates a block diagram for a system 100 to provide proxies for web services. In one embodiment, for example, the system 100 may comprise a computer-implemented system 100 having multiple components, such as a web service server 110, and client devices 130 and 140. As used herein the terms "system" and "component" are intended to refer to a computer-related entity, comprising either hardware, a combination of hardware and software, software, or software in execution. For example, a component can be implemented as a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers as desired for a given implementation. The embodiments are not limited in this context.

In the illustrated embodiment shown in FIG. 1, the system 100 may be implemented with one or more electronic devices. Examples of an electronic device may include without limitation a mobile device, a personal digital assistant, a mobile computing device, a smart phone, a cellular telephone, a handset, a one-way pager, a two-way pager, a messaging device, a computer, a personal computer (PC), a desktop computer, a laptop computer, a notebook computer, a handheld computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, television, digital television, set top box, wireless access point, base station, subscriber station, mobile subscriber center, radio network controller, router, hub, gateway, bridge, switch, machine, or combination thereof. Although the system 100 as shown in FIG. 1 has a limited number of elements in a certain topology, it may be appreciated that the system 100 may include more or less elements in alternate topologies as desired for a given implementation.

The components 110 and 130, 140 may be communicatively coupled via various types of communications media. The components 110 and 130, 140 may coordinate operations between each other. The coordination may involve the uni-directional or bi-directional exchange of information. For instance, the components 110 and 130 may communicate information in the form of signals communicated over a communications medium. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

In an embodiment, an apparatus comprises a processing unit, a network interface coupled to the processing unit, and a web service executing web service requests on the processing unit using a native format. The apparatus may further include a proxy to receive a web service request in a first format via the network interface and to translate the web service request from the first format to the native format.

In various embodiments, the system 100 may include web service server 110. Web service server 110 may be one or more servers that provide a service to client devices. For example, web service server 110 may be an electronic mail server that allows remote clients to connect, view, create, and manage e-mail messages. Web service server 110 may be a collaboration service server that allows clients to connect, and view and/or edit documents. The embodiments are not limited to these examples.

Web service server 110 may include a network interface 112 to receive incoming requests for web services and transmit responses to the web service requests. Network interface 112 may be coupled to a network (not shown), such as a local area network, a wide area network, or the Internet. Network interface 112 is described further with respect to FIG. 5.

Web service server 110 may include a web service application 120. Web service application 120 may include program instructions that execute on one or more processing units (not shown) on web service server 110 to provide the web service functionality, e.g. the e-mail functions, or the document collaboration functions. Examples for web service application may include without limitation MICROSOFT WINDOWS LIVE®, MICROSOFT OFFICE WEB APPLICATIONS, MICROSOFT OFFICE LIVE, MICROSOFT LIVE MEETING, MICROSOFT OFFICE PRODUCT WEB SITE, MICROSOFT UPDATE SERVER, MICROSOFT EXCHANGE SERVER, MICROSOFT EXCHANGE WEB SERVICES, and MICROSOFT OFFICE 365. In an embodiment, web service application 120 may support a limited number of protocols, such as SOAP. Web service application 120 may be written in a variety of programming languages, for example, VISUAL BASIC® or C#.

Web service application 120 may make use of native data types 122. Native data types 122 may include data types that are part of the language or languages used to program web service application 120. For example, native data types 122 may include a programming language's definitions for data types such as integer, string, array, floating point number, and so forth. Native data types 122 may include data types defined specifically for web service application 120, such as a class, a data structure, and so forth. Native data types 122 may, or may not, be visible to other applications connecting to web service application 120. In an embodiment, native data types 122 may include, for example, .NET data types, provided by MICROSOFT® CORP.

Web service server 110 may include one or more application program interfaces (APIs) 124. API 124 may provide an interface for external applications to connect to and communicate with web service application 120. For example, API 124 may specify various function signatures that describe the number and types of parameters to be passed to the functions and the return type, if any, of a return value. In an embodiment, API 124 may provide an interface to client applications that can communicate using the same protocol as that used by web service application 120. API 124 may receive requests from, and provide responses to, a client in a format compatible with the native format, which API 124 may use to communicate with web service application 120.

Web service server 110 may include a proxy 126. Proxy 126 may receive requests for web services in a first format different from the format recognized by the web service application 120. Proxy 126 may translate requests for web services into a format recognized by web service application 120. For example, proxy 126 may translate a request in a JSON format into a format that uses native data types 122. Proxy 126 may include functions, sub-routines, classes, scripts, or other executable instructions that operate on the first format to convert the first format to the native format. For example, proxy 126 may include a set of classes that have various class functions capable of performing conversions. One class, for example, may include functions for writing different data types. When a native data type 122 specifies, for example, that an integer, a string, and a Boolean value are needed to create an instance of the data type, proxy 126 may instantiate an instance of the writing class. For each value that is passed to create the instance of the native data type, proxy 126 may call the write functions for integer, string, and Boolean, such that the return values of the write functions become the input values to create the native data type. Proxy 126 is described further with respect to FIGS. 2 and 3.

In various embodiments, the system 100 may comprise client devices 130, 140. Client devices 130, 140 may include a wired or wireless computing device operating various applications, such as a browser, application viewer or other application program, suitable for connecting to and communicating with web service server 110. Devices 130, 140 may receive and respond to control directives from a user, for example, input from an input device that causes a browser to connect to a specific website; a word processing application to open a file; and so forth. Client devices 130, 140 may be directly communicatively coupled to an intranet. Client devices 130, 140 may be communicatively coupled to an intranet via an external network. Client devices 130, 140 may communicatively couple to an external network, e.g. the Internet, without being coupled to an intranet. The embodiments are not limited to these examples.

Client device 130 may include a client browser application 132 operating from a web browser application (not shown). Examples of a web browser application may include without limitation EXPLORER by MICROSOFT®CORP., SAFARI® by APPLE® INC., or CHROME BROWSER® by GOOGLE®. While executing within a web browser application, client browser application 132 may connect to web service application 120 and provide client-side functions served from web service application 120. Client browser application 132 may be written or implemented in a language that is different from the language(s) used to write web service application 120. For example, client browser application 132 may be written in JavaScript. For example, client browser application 132 may be an e-mail client application that connects to an e-mail server, e.g. web services server 110, and provides a user interface on client device 130 to show e-mail messages within a web browser application. Client browser application 132 may communicate using requests in a first format, for example, the JSON format, that is different from the format expected by API 124.

Client device 140 may include a client application 142. Client application 142 may execute independently on client device 140, that is, outside of a web browser application. Client application 142 may request web services from web services server 110. Client application 142 may be, for example, an e-mail application, such as MICROSOFT OUTLOOK®. Client application 142 may communicate with web services application 120 using API 124 in the format that is expected by API 124. Client application 142 may be written in the same language(s) used to write web service application 120, or in a language that uses data types that are recognized by web service application 120.

Figure 2:
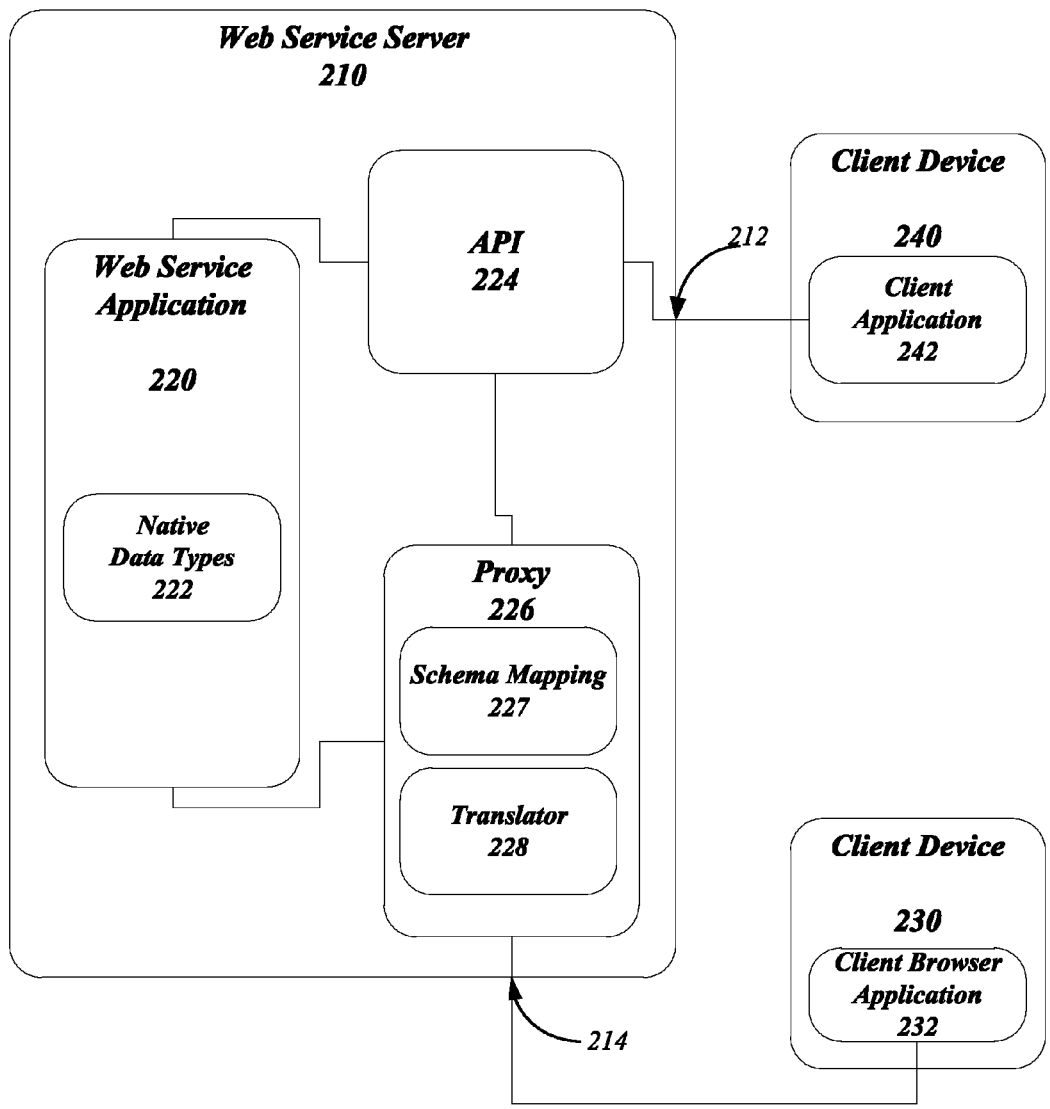
FIG. 2 illustrates an embodiment of a second system for providing a proxy to a web service.

FIG. 2 illustrates a block diagram of a system 200 to provide proxies for web services. The system 200 may be similar to the system 100, where web service server 210, and client devices 230, 240 may be representative embodiments of web service server 110, and client devices 130, 140, respectively. Web service application 220, native data types 222, and API 224 may be representative embodiments of web service application 120, native data types 122, and API 124, respectively. Client devices 230, 240 may be representative embodiments of client devices 130, 140, respectively. Client browser application 232 and client application 242 may be representative embodiments of client browser application 132 and client application 142, respectively.

In various embodiments, system 200 may provide two, or more, access points to reach web service application 220. A first access point 212 may be via API 224. Client application 242 may use API 224 to request web services from web service application 220. A second access point 214 may be via proxy 226. Client browser application 232 may request web services in a first format, different from a format used by API 224. In an embodiment, the first format may be the JSON format. In an embodiment, access point 212 may have a network address that is different from access point 214. In another embodiment, access points 212 and 214 may share a network address, but may be accessed according to the format of the request for web services. For example, all requests may be received at a network interface, e.g. network interface 112. Requests in the format of a function call to an API 224 function may be sent to access point 212, while requests that are in the format of a uniform resource locator (URL) containing JSON data may be sent to access point 214.

Proxy 226 may include a schema mapping 227 that maps the constructs of the first format to the native data types 222. The schema mapping 227 may be used by translator 228 to translate incoming requests in the first format to the format that is native to web service application 220, and to translate responses from web service application 220 to the first format to return to client browser application 232. In an embodiment, schema mapping 227 may map between, for example, JSON and .NET data types, or between SOAP and .NET data types. For example, schema mapping 227 may include a map between a JSON format for a string data type and a .NET format for a string data type. A mapping may include calling a function, routine, a class object function, or other sequence of programming instructions to translate one format to another. For example, when an array type is received, schema mapping 227 may indicate that a call to a function, e.g. "ConvertJSONArray", is used to make the conversion. The function may accept a JSON array as input and return a .NET array as output. Proxy 226 may call the function with the received JSON array from the web service request and receive the .NET array as output. The output may then be used as input to a web service application 220 function. The embodiments are not limited to these examples.

In an embodiment, web service server 210 may include multiple proxies 226, where each of the proxies 226 may be a proxy for a specific format. In an embodiment, one proxy 226 may include multiple schema mappings 227, where each schema mapping 227 maps from one format to the native format. In such an embodiment, one or multiple translators 228 may be used.

In an embodiment, a web service request in the first format from client browser application 232 may be received at proxy 226 and translated to the format of API 224. The translated web service request from API 224 may be processed by web service application 220 to generate a response in the native format. The response in the native format may be returned through API 224 to proxy 226. Proxy 226 may translate the response from the native format to the first format for return to client browser application 232.

Figure 3:
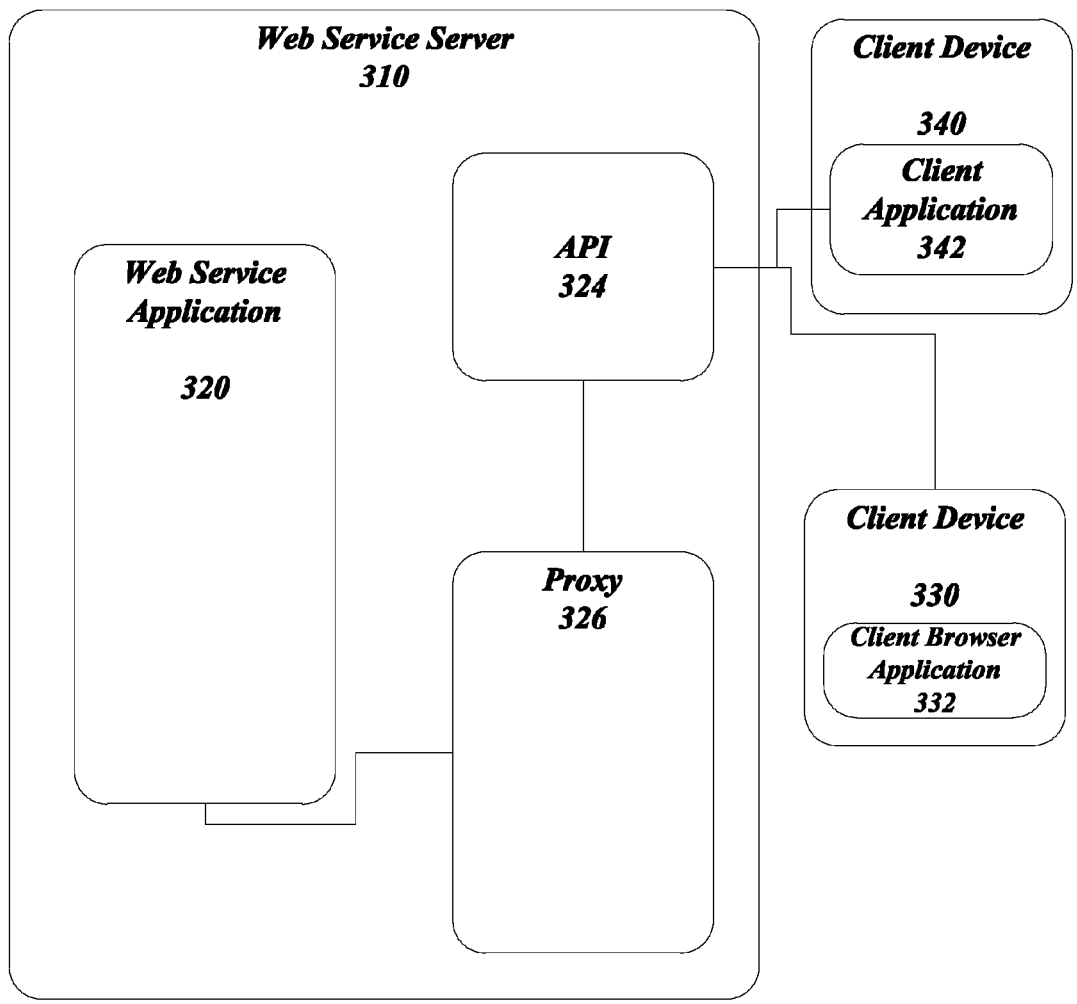
FIG. 3 illustrates an embodiment of a third system for providing a proxy to a web service.

FIG. 3 illustrates a block diagram of a system 300 to provide proxies for web services. The system 300 may be similar to system 100 and system 200, where web service server 310, and client devices 330, 340 may be representative embodiments of web service server 110, and client devices 130, 140, respectively. Web service application 320, and API 224 may be representative embodiments of web service application 120, and API 124, respectively. Client devices 330, 340 may be representative embodiments of client devices 130, 140, respectively. Client browser application 332 and client application 342 may be representative embodiments of client browser application 132 and client application 142, respectively.

In an embodiment, in system 300, all requests for web services are received by API 324, regardless of format. API 324 may pass requests in the first format, e.g. those generated by client browser application 332, to proxy 336 for translation to the format supported by web service application 320.

Figure 4:
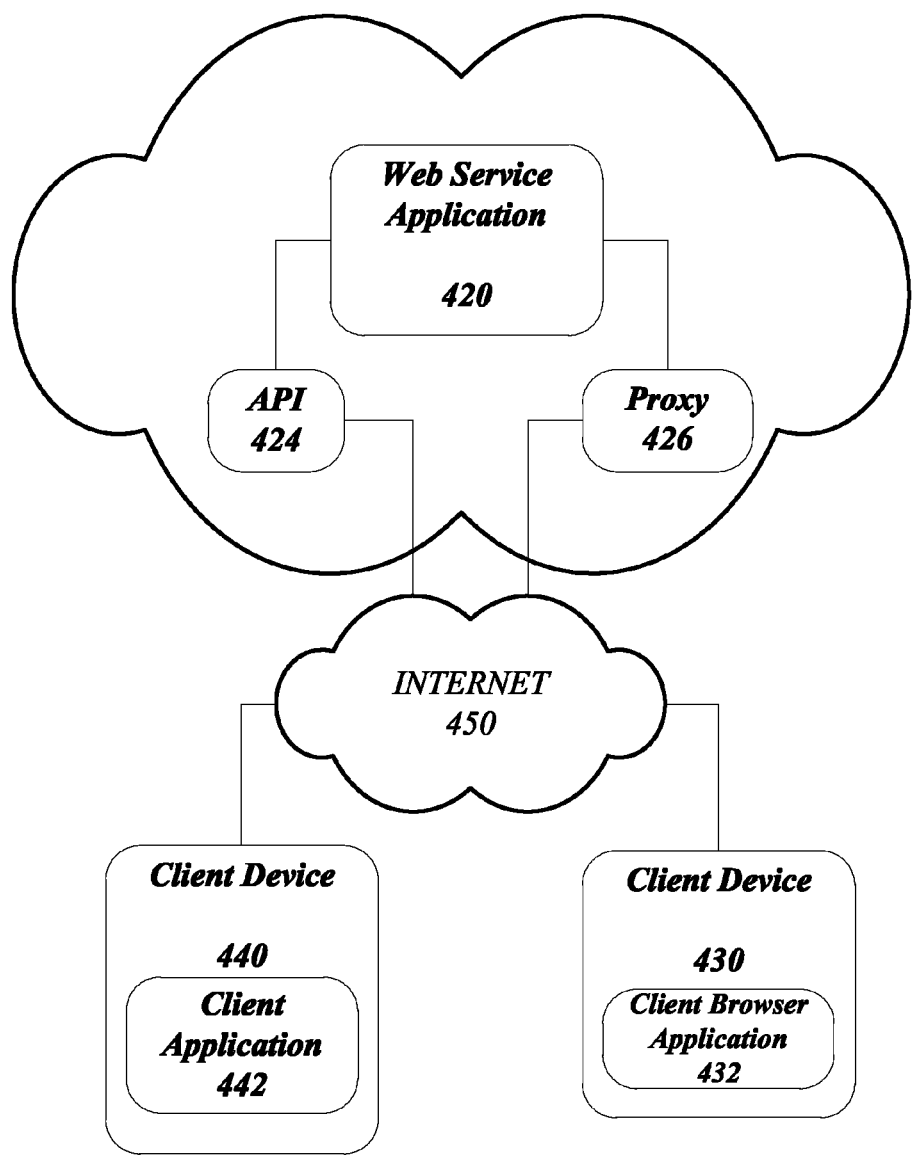
FIG. 4 illustrates an embodiment of a fourth system for providing a proxy to a web service.

FIG. 4 illustrates a block diagram of a system 400 to provide proxies for web services. System 400 may be a cloud computing model based system. Cloud computing, generally, provides applications, data storage, data access, and other computing services without an end-user having to know about the location or configuration of the system providing the services. An individual may access the web service application 420, for example, from any client device, e.g. client device 430, 440 via the Internet 450. However, web service application 420 may be installed on one or more servers. API 424 and proxy 446 may be installed on different servers from each other and from web service application 420. System 400 may behave analogously to systems 100, 200 and/or 300, but with a different configuration.

FIG. 5 illustrates an example of a JSON GET request 500 according to embodiments. JSON GET request 500 may be used by a client browser application 132, 232 to "get" a particular item from an electronic mail mailbox. JSON GET request 500 includes two headers that improve functionality in getting an item from a MICROSOFT EXCHANGE WEB SERVICES® server.

Time zone header 502 may include a setting that indicates that the requesting client is using a specific time zone, in this example, Pacific Standard Time. Being able to specify the time zone informs the server of what time zone to apply in providing the requested item. This may improve the user experience in determining, for example, when a meeting starts, or when an e-mail message was received in the client's time zone.

Version header 504 may include a setting that indicates to the server what version of the web service the client wants to communicate with. In version header 504, in this example, the version expected by the client is "Exchange2012." Including version header 504 in a JSON request makes it possible for the web services server to service clients using many different versions of the web browser application, or client application. A client using a different version, may specify that version in version header 504. The setting in version header 504 may inform proxy 126, 226, 326 about which version of the web services to target when translating the request.

The body portion of JSON GET request 500, beginning after version header 504, may include information relevant to the request, such as an ID of the item to "get."

FIG. 6 illustrates an example of a JSON FINDITEM request 600 according to embodiments. JSON FINDITEM request 600 may be used by a client browser application 132, 232 to "find" one or more items from an electronic mail mailbox. Similar to JSON GET request 500, JSON FINDITEM request 600 may also have a time zone header 602 and a version header 604 in the header portion of the request.

The body portion of JSON FINDITEM request 600, beginning after version header 604, may include information relevant to the request, including additional properties that can be used to narrow the search for an item. Some properties may include, for example, that the item is a calendar item, and sub-properties of the calendar item, such as start time, a location, and the subject.

FIG. 7 illustrates an example of a JSON UPDATEITEM request 700 according to embodiments. JSON UPDATEITEM request 700 may be used by a client browser application 132, 232 to update a particular item from an electronic mail mailbox. JSON UPDATE ITEM request 700 may also have a time zone header 702 and a version header 704 in the header portion of the request.

The body portion of JSON UPDATEITEM request 700, beginning after version header 704, may include information relevant to updating the item, such as changing an item, e.g. an e-mail message, to "is read."

In an embodiment, the headers in a JSON request may be of a string type. Using a string, which is generally static, instead of, for example, an integer, may insulate the clients from having to make changes. For example, when a version is added, the client can merely use the version string that came with the version. A proxy may need to create a new schema map for the new version to the version information that the web service application uses, but the client is insulated from that change.

Similarly, the JSON requests may use strings in enumerated types, rather than, for example, integers. In SOAP, for example, an enumerated type may be comprised of integers. A calendar slot status type in SOAP, for example, may have the possible values 0, 1, 2, and 3, which may correspond to the statuses of "free", "busy", "out-of-office", and "remote", respectively. A JSON request, according to embodiments, may set or change a calendar slot status by passing a string, e.g. "busy", rather than the integer that the SOAP type would use. Proxy 126, 226, 326 may receive the string from the JSON request, and the version from the version header, and translate the string to the enumerated type integer for SOAP according to the version. Similarly, when the web service application returns an integer value in an enumerated type, the proxy may translate that integer into the corresponding string.

The enclosed computer program listing shows an example of a JSON request to find a conversation from a MICROSOFT EXCHANGE WEB SERVICES® server. Similar to the examples in FIGS. 5-7, the request includes a time zone header and a version header.

The enclosed computer program listing also shows an example of a response from the server after it has been translated to JSON by the proxy. The response may include a version header as well, in this example, the version is "Exchange2012". In an embodiment, most of the information may be passed to and from the client as strings. Exceptions to this may include data fields where the value is an integer, such as a "message count" field, or where the value of the data field is a Boolean, e.g. true/false, such as the "has attachments" field.

Operations for the above-described embodiments may be further described with reference to one or more logic flows. It may be appreciated that the representative logic flows do not necessarily have to be executed in the order presented, or in any particular order, unless otherwise indicated. Moreover, various activities described with respect to the logic flows can be executed in serial or parallel fashion. The logic flows may be implemented using one or more hardware elements and/or software elements of the described embodiments or alternative elements as desired for a given set of design and performance constraints. For example, the logic flows may be implemented as logic (e.g., computer program instructions) for execution by a logic device (e.g., a general-purpose or specific-purpose computer).

FIG. 8 illustrates one embodiment of a logic flow 800. The logic flow 800 may be representative of some or all of the operations executed by one or more embodiments described herein. Logic flow 800 may be performed by various systems and/or devices and may be implemented as hardware, software, and/or any combination thereof, as desired for a given set of design parameters or performance constraints. For example, the logic flow 800 may be implemented by a logic device (e.g., processor) and/or logic (e.g., threading logic) comprising instructions, data, and/or code to be executed by a logic device. For purposes of illustration, and not limitation, the logic flow 800 is described with reference to FIGS. 1, 2, and/or 3. The embodiments are not limited in this context.

In the illustrated embodiment shown in FIG. 8, the logic flow 800 may receive, at a web service executing on a web service server, a web service request in a first format from a client at block 802. For example, web service server 110 may receive, via network interface 112, a web service request from client device 140. The first format may be JSON format, another data format that is easy for web clients to parse, or any format different from the format native to the web service application receiving the request.

The logic flow 800 may translate the web service request into a second format native to the web service at block 804. For example, proxy 126 may use schema mapping 227 to map the first format data types into native data types 222 that web service application 120 can understand. In an embodiment where the first format is JSON, proxy 126 may deserialize a JSON request into the native data types 222. Deserializing may include building up a native data type 222 from the data types in the JSON request.

The logic flow 800 may process the web service request to generate a response in the native format at block 806. For example, if web service application 120 is an e-mail server, and the request is for the data in the account holder's mailbox, web service application 120 may retrieve the mailbox data as native data types 122 and return the data to proxy 126.

The logic flow 800 may translate the response from the native format to the first format at block 808. For example, in the above example, proxy 126 may receive the mailbox data in the native format from web service application 120 and may use schema mapping 227 to translate the native data types 122 into the first format. In an embodiment where the first format is JSON, proxy 126 may serialize the response in the native format into a JSON formatted response. Serializing may include converting the native format response's public properties and fields into a serial format.

The logic flow 800 may provide the response in the first format to the client at block 810. For example, proxy 126 may return the response in the first format back to client browser application 132.

In an embodiment, a web service request in the first format may be translated to the format of API 224, for example by proxy 226. The web service request from API 224 may be processed to generate a response in the native format, which may be returned through API 224 to proxy 226. Proxy 226 may translate the response from the native format to the first format for return to client browser application 232.

In an embodiment, a web service request may be received via API 324 in the first format. The web service request may be translated by proxy 326 into the native format. The response may be translated into the first format and returned to client browser application 332 via API 324.

Figure 9:
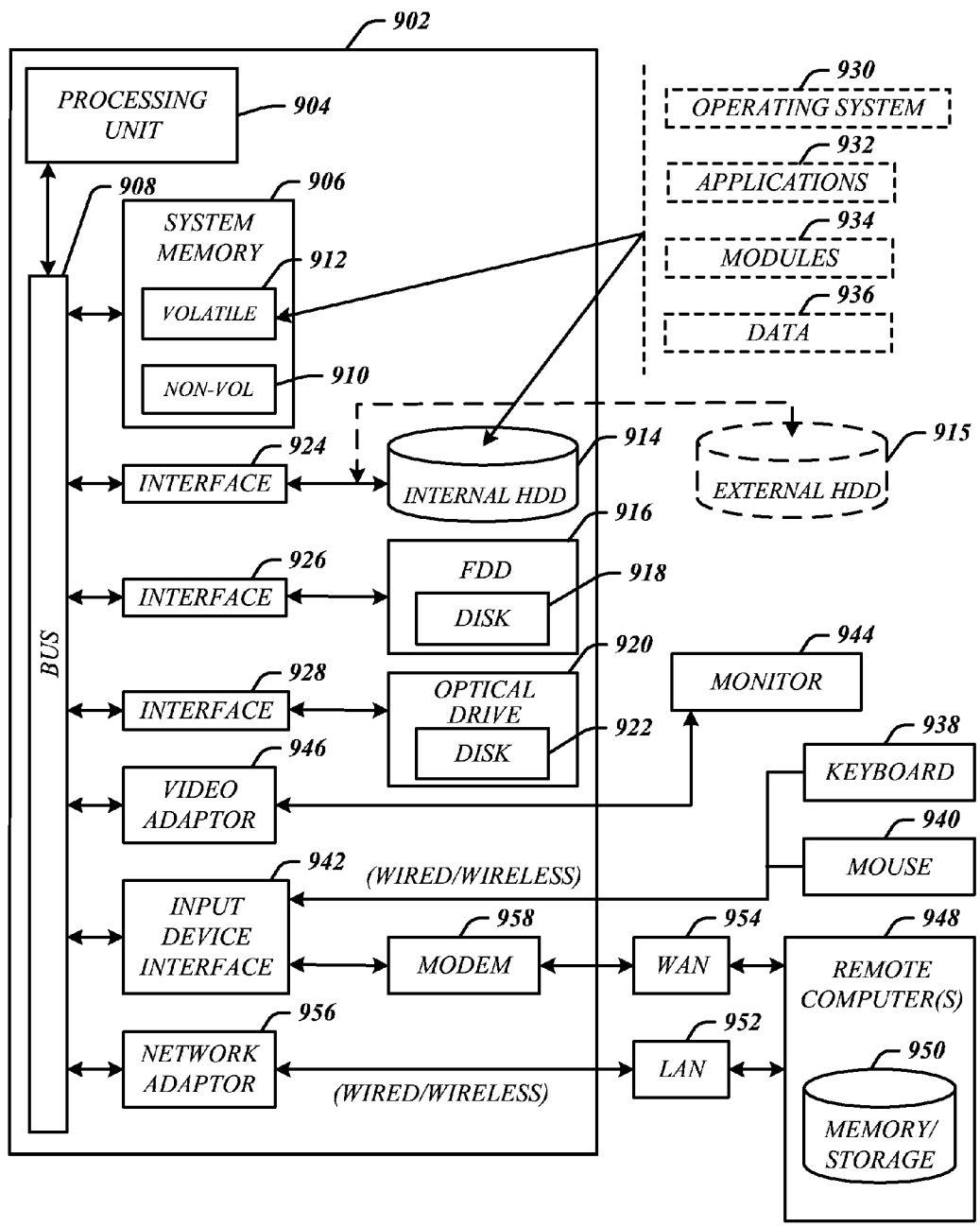
FIG. 9 illustrates an embodiment of a computing architecture.

FIG. 9 illustrates an embodiment of an exemplary computing architecture 900 suitable for implementing various embodiments as previously described. The computing architecture 900 includes various common computing elements, such as one or more processors, co-processors, memory units, chipsets, controllers, peripherals, interfaces, oscillators, timing devices, video cards, audio cards, multimedia input/output (I/O) components, and so forth. The embodiments, however, are not limited to implementation by the computing architecture 900.

As shown in FIG. 9, the computing architecture 900 comprises a processing unit 904, a system memory 906 and a system bus 908. The processing unit 904 can be any of various commercially available processors. Dual microprocessors and other multi-processor architectures may also be employed as the processing unit 904. The system bus 908 provides an interface for system components including, but not limited to, the system memory 906 to the processing unit 904. The system bus 908 can be any of several types of bus structure that may further interconnect to a memory bus (with or without a memory controller), a peripheral bus, and a local bus using any of a variety of commercially available bus architectures.

The system memory 906 may include various types of memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. In the illustrated embodiment shown in FIG. 9, the system memory 906 can include non-volatile memory 910 and/or volatile memory 912. A basic input/output system (BIOS) can be stored in the non-volatile memory 910.

The computer 902 may include various types of computer-readable storage media, including an internal hard disk drive (HDD) 914, an external HDD 915, a magnetic floppy disk drive (FDD) 916 to read from or write to a removable magnetic disk 918, and an optical disk drive 920 to read from or write to a removable optical disk 922 (e.g., a CD-ROM or DVD). The HDD 914, FDD 916 and optical disk drive 920 can be connected to the system bus 908 by a HDD interface 924, an FDD interface 926 and an optical drive interface 928, respectively. The HDD interface 924 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 910, 912, including an operating system 930, one or more application programs 932, other program modules 934, and program data 936. The one or more application programs 932, other program modules 934, and program data 936 can include, for example, the web service application 120, client browser application 132, client application 142, API 124, and proxy 126.

A user can enter commands and information into the computer 902 through one or more wire/wireless input devices, for example, a keyboard 938 and a pointing device, such as a mouse 940. Other input devices may include a microphone, an infra-red (IR) remote control, a joystick, a game pad, a stylus pen, touch screen, or the like. These and other input devices are often connected to the processing unit 904 through an input device interface 942 that is coupled to the system bus 908, but can be connected by other interfaces such as a parallel port, IEEE 1394 serial port, a game port, a USB port, an IR interface, and so forth.

A monitor 944 or other type of display device is also connected to the system bus 908 via an interface, such as a video adaptor 946. In addition to the monitor 944, a computer typically includes other peripheral output devices, such as speakers, printers, and so forth.

The computer 902 may operate in a networked environment using logical connections via wire and/or wireless communications to one or more remote computers, such as a remote computer 948. The remote computer 948 can be a workstation, a server computer, a router, a personal computer, portable computer, microprocessor-based entertainment appliance, a peer device or other common network node, and typically includes many or all of the elements described relative to the computer 902, although, for purposes of brevity, only a memory/storage device 950 is illustrated. The logical connections depicted include wire/wireless connectivity to a local area network (LAN) 952 and/or larger networks, for example, a wide area network (WAN) 954. Such LAN and WAN networking environments are commonplace in offices and companies, and facilitate enterprise-wide computer networks, such as intranets, all of which may connect to a global communications network, for example, the Internet.

When used in a LAN networking environment, the computer 902 is connected to the LAN 952 through a wire and/or wireless communication network interface or adaptor 956. Interface or adaptor 956 may be a representative embodiment of network interface 112. The adaptor 956 can facilitate wire and/or wireless communications to the LAN 952, which may also include a wireless access point disposed thereon for communicating with the wireless functionality of the adaptor 956.

When used in a WAN networking environment, the computer 902 can include a modem 958, or is connected to a communications server on the WAN 954, or has other means for establishing communications over the WAN 954, such as by way of the Internet. The modem 958, which can be internal or external and a wire and/or wireless device, connects to the system bus 908 via the input device interface 942. In a networked environment, program modules depicted relative to the computer 902, or portions thereof, can be stored in the remote memory/storage device 950. It will be appreciated that the network connections shown are exemplary and other means of establishing a communications link between the computers can be used.

The computer 902 is operable to communicate with wire and wireless devices or entities using the IEEE 802 family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity), WiMax, and Bluetooth™ wireless technologies. Thus, the communication can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3-related media and functions).

Figure 10:
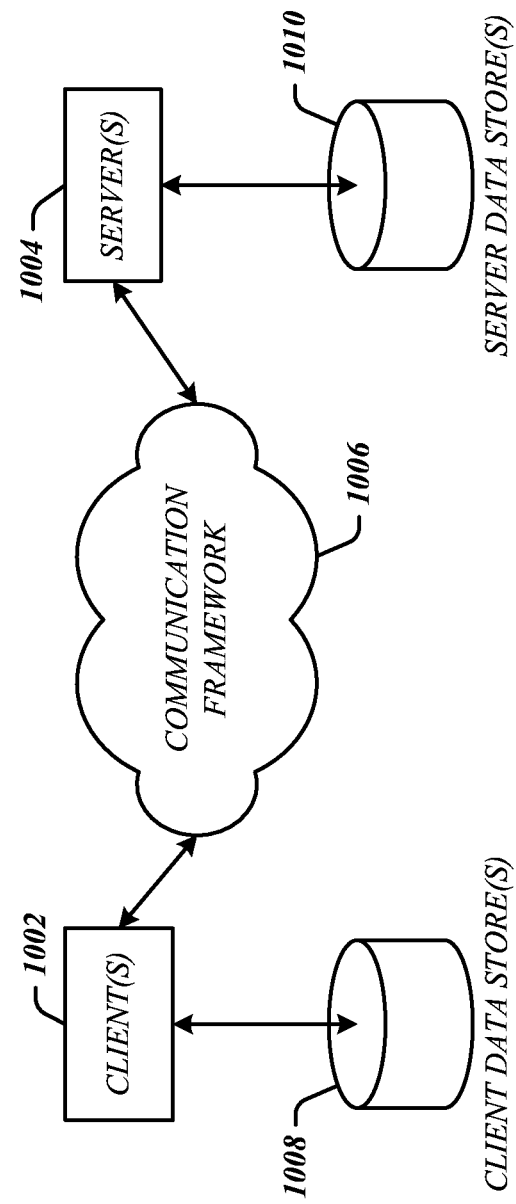
FIG. 10 illustrates an embodiment of a communications architecture.

FIG. 10 illustrates a block diagram of an exemplary communications architecture 1000 suitable for implementing various embodiments as previously described. The communications architecture 1000 includes various common communications elements, such as a transmitter, receiver, transceiver, radio, network interface, baseband processor, antenna, amplifiers, filters, and so forth. The embodiments, however, are not limited to implementation by the communications architecture 1000.

As shown in FIG. 10, the communications architecture 1000 comprises includes one or more clients 1002 and servers 1004. The clients 1002 may implement the client systems 130, 140, 230, 240, 330, 340, 430, 440. The servers 1004 may implement the server systems 110, 210, 310. The clients 1002 and the servers 1004 are operatively connected to one or more respective client data stores 1008 and server data stores 1010 that can be employed to store information local to the respective clients 1002 and servers 1004, such as cookies and/or associated contextual information.

The clients 1002 and the servers 1004 may communicate information between each other using a communication framework 1006. The communications framework 1006 may implement any well-known communications techniques, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The clients 1002 and the servers 1004 may include various types of standard communication elements designed to be interoperable with the communications framework 1006, such as one or more communications interfaces, network interfaces, network interface cards (NIC), radios, wireless transmitters/receivers (transceivers), wired and/or wireless communication media, physical connectors, and so forth. By way of example, and not limitation, communication media includes wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media. One possible communication between a client 1002 and a server 1004 can be in the form of a data packet adapted to be transmitted between two or more computer processes. The data packet may include a cookie and/or associated contextual information, for example.

Various embodiments may be implemented using hardware elements, software elements, or a combination of both. Examples of hardware elements may include devices, components, processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some embodiments may comprise an article of manufacture. An article of manufacture may comprise a storage medium to store logic. Examples of a storage medium may include one or more types of computer-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. In one embodiment, for example, an article of manufacture may store executable computer program instructions that, when executed by a computer, cause the computer to perform methods and/or operations in accordance with the described embodiments. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain function. The instructions may be implemented using any suitable high-level, low-level, object-oriented, visual, compiled and/or interpreted programming language.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

---

COMPUTER PROGRAM LISTING

Example of a JSON request to a MICROSOFT EXCHANGE WEB SERVICES ® Server:
```
{
    "_type":"FindConversationJsonRequest:#Exchange",
    "Header":{
        "_type":"JsonRequestHeaders:#Exchange",
        "TimeZoneContext":{
            "_type":"TimeZoneContext:#Exchange",
            "TimeZoneDefinition":{
                "_type":"TimeZoneDefinitionType:#Exchange".
                "Id":"Pacific Standard Time"
            }
        },
        "RequestServerVersion":"Exchange2012"
    },
    "Body":{
```

-continued

COMPUTER PROGRAM LISTING

```
        "_type":"FindConversationRequest:#Exchange",
        "ParentFolderId":{
            "_type":"TargetFolderId:#Exchange",
            "BaseFolderId":{
                "_type":"FolderId:#Exchange",
                "Id":"AAMkAGVhMmRhZDZjLTEwMDktNDU0OC05YWI0LThkYzM4ODIxYTY1Zg
AuAAAAAACa7evLXL6CR4+BGV+LVcSZAQCZELzWizHqRaHLedD525uIAAAB2mlQAAA
="
            }
        },
        "ViewFilter":"All",
        "ConversationShape":{
            "_type":"ConversationResponseShape:#Exchange",
            "AdditionalProperties":{
                {
                    "_type":"PropertyUri:#Exchange",
                    "FieldURI":"ConversationGlobalParentFolderIds"
                },
                {
                    "_type":"PropertyUri:#Exchange",
                    "FieldURI":"ConversationNextPredictedAction"
                }
            },
            "BaseShape":"Default"
        },
        "Paging":{
            "_type":"IndexedPageView:#Exchange".
            "BasePoint":"Beginning",
            "MaxEntriesReturned":40,
            "Offset":0
        }
    }
}
Example of a JSON response received from a MICROSOFT EXCHANGE WEB
SERVICES ® Server:
{
    "Header":{
        "ServerVersionInfo":{
            "MajorVersion":15,
            "MinorVersion":0,
            "MajorBuildNumber":320,
            "MinorBuildNumber":0,
            "Version":"Exchange2012"
        }
    },
    "Body":{
        "ResponseCode":"NoError",
        "ResponseClass":"Success",
        "Conversations":{
            {    {
                "ConversationId":{
                    "Id":"AAQkAGVhMmRhZDZjLTEwMDktNDU0OC05YWI0LThkYzM4ODIxYTY1Z
gAQAED2G54FGkwtnHgTt1CvEiw="
                },
                "ConversationTopic":"Today's Shirt.Woot!",
                "UniqueRecipients":[
                    "Bob Congdon",
                    "David Claux"
                ],
                "GlobalUniqueRecipients":[
                    "Michael Loughry",
                    "David Claux",
                    "Bob Congdon"
                ],
                "UniqueUnreadSenders":[
                    "Michael Loughry"
                ],
                "GlobalUniqueUnreadSenders":[
                    "Michael Loughry"
                ],
                "UniqueSenders":[
                    "Michael Loughry"
                ],
                "GlobalUniqueSenders":[
                    "Bob Congdon",
                    "Michael Loughry"
                ],
```

-continued

COMPUTER PROGRAM LISTING

```
        "LastDeliveryTime":"2010-06-01T15:39:32-07:00",
        "GlobalLastDeliveryTime":"2010-06-01T15:46:00-07:00",
        "FlagStatus":"Flagged".
        "GlobalFlagStatus":"Flagged",
        "HasAttachments":false,
        "GlobalHasAttachments":false,
        "MassageCount":1,
        "GlobalMessageCount":2,
        "UnreadCount":1,
        "GlobalUnreadCount":1,
        "Size":145260,
        "GlobalSize":415248,
        "ItemClasses":[
           "IPM.Note"
        ],
        "GlobalItemClasses":[
           "IPM.Note"
        ],
        "Importance":"Normal",
        "GlobalImportance":"Normal",
        "ItemIds":[
           [
              "_type":"ItemId:#Exchange",
              "ChangeKey":"CQAAAA==",
              "Id":"AAMkAGVhMmRhZDZjLTEwMDktNDU0OC05YWI0LThkYzM4ODIxYTY
1ZgBGAAAAAACa7evLXL6CR4+BGV+LVcSZBwCZELzWizHqRaHLedD525uIAAAB2mlQ
AABdSNr+EuSBTIuryQyFy6ThAAAM3CYPAAA="
           }
        ],
        "GlobalItemIds":[
           {"
              "_type":"ItemId:#Exchange",
              "ChangeKey":"CQAAAA==",
              "Id":"AAMkAGVhMmRhZDZjLTEwMDktNDU0OC05YWI0LThkYzM4ODIxYTY
1ZgBGAAAAAACa7evLXL6CR4+BGV+LVcSZBwCZELzWizHqRaHLedD525uIAAAB2mlS
AACp+WcHBrc8T6px9q27BVO3AAACB34uAAA="
           },
           {
              "_type":"ItemId:#Exchange",
              "ChaageKey":"CQAAAA==",
              "Id":"AAMkAGVhMmRhZDZjLTEwMDktNDU0OC05YWI0LThkYzM4ODIxYTY
1ZgBGAAAAAACa7evLXL6CR4+BGV+LVcSZBwCZELzWizHqRaHLedD525uIAAAB2mlQ
AABdSNr+EuSBTIuryQyFy6ThAAAM3CYPAAA="
           }
        ],
        "LastModifiedTime":"2011-10-26T21:53:42-07:00",
        "InstanceKey":"AgAAAAAAAAECAAAAAAHQ0wAAAAA=",
        "GlobalParentFolderIds":[
           {
              "_type":"FolderId:#Exchange",
              "Id":"AAMkAGVhMmRhZDZjLTEwMDktNDU0OC05YWI0LThkYzM4ODIxYTY
1ZgAuAAAAAACa7evLXL6CR4+BGV+LVcSZAQCZELzWizHqRaHLedD525uIAAAB2mlSA
AA=",
              "ChangeKey":"AQAAAA=="
           },
           {
              "_type":"FolderId:#Exchange",
              "Id":"AAMkAGVhMmRhZDZjLTEwMDktNDU0OC05YWI0LThkYzM4ODIxYTY
1ZgAuAAAAAACa7evLXL6CR4+BGV+LVcSZAQCZELzWizHqRaHLedD525uIAAAB2mlQ
AAA=",
              "ChangeKey":"AQAAAA=="
           }
        ],
        "InferredImportance":"None",
        "GlobalInferredImportance":"None",
        "NextPredictedAction":2
     }
           ],
     "TotalConversationsInView":17645
  }
}
```

The invention claimed is:

1. A computer-implemented method, comprising:
providing a first access point for requests to an application program interface (API) to a web service executing on a web service server wherein the API communicates with the web service using a format native to the web service;
providing a second access point for requests in a first format, wherein the API receives requests from and provides responses to a client in a format different from the first format, wherein the first format is JavaScript Object Notation (JSON);
processing a web service request from the client;
translating the web service request into the format native to the web service;
processing the web service request to generate a response in the format native to the web service;
sending the web service request to the first access point when the web service request is in the format different from the first format;
translating the response from the format native to the web service to the first format;
sending the web service request to the second access point when the web service request is in the first format, including when the client is implemented in a language that is different from a language used for the web service; and
providing the response in the first format to the client.

2. The method of claim 1, further comprising:
deserializing a JSON request into at least one data type in the format native to the web service; and
passing the at least one data type to the web service.

3. The method of claim 1, further comprising:
translating the web service request in the first format to the format of the API;
processing the web service request from the API to generate a response in the format native to the web service; and
translating the response from the format native to the web service to the first format.

4. The method of claim 1, further comprising:
receiving the web service request via the API in the first format; and
translating the web service request into the format native to the web service.

5. An article comprising computer-readable storage hardware containing instructions that when executed cause a system to:
provide a first access point for requests to an application program interface (API) to a web service, wherein the API communicates with the web service using a format native to the web service;
provide a second access point for requests in a first format, wherein the API receives requests from and provides responses to a client in a format different from the first format, wherein the first format is JavaScript Object Notation (JSON);
process a schema mapping between constructs of the first format to native data types at the web service;
send a received web service request to the first access point when the web service request is in the format different from the first format and compatible with the native format;
send a received web service request to the second access point when the web service request is in the first format;
translate the web service request into the format native to the web service by converting a data type in the first format to a data type in the format native to the web service;
provide the web service request to the API to process the web service request to generate a response in the format native to the web service;
translate the response from the format native to the web service to the first format; and
provide the response in the first format to a client.

6. The article of claim 5, wherein the storage hardware further comprising instructions that when executed cause the system to:
deserialize a JSON request into at least one data type in the format native to the web service; and
process the web service request according to the at least one data type.

7. The article of claim 5, the storage hardware further comprising instructions that when executed cause the system to:
translate the web service request in the first format to the format of the API;
process the web service request from the API to generate a response in the format native to the web service; and
translate the response from the format native to the web service to the first format.

8. The article of claim 5, the storage hardware further comprising instructions that when executed cause the system to:
receive the web service request via the API in the first format; and
translate the web service request into the format native to the web service.

9. An apparatus, comprising:
a processor;
a network interface coupled to the processor;
a web service application executing web service requests on the processor using a native format, the web service application being implemented in a language that is different from a language used for a client sending the web service requests;
a proxy to receive a web service request in a first format via the network interface and to translate the web service request from the first format to the native format for the web service application to execute, wherein the first format is JavaScript Object Notation (JSON), and to translate a response to a web service request from the native format to the first format;
an application program interface (API) to the web service application, the API to receive web service requests from, and provide responses to, a client in a format different from the first format, wherein the API communicates with the web service using the native format;
a first access point for requests to the API; and
a second access point for requests in the first format.

10. The apparatus of claim 9, wherein the web service request includes at least one of: a time zone header and a version header.

11. The apparatus of claim 9, the proxy further to translate the web service request in the first format to the format of the API; and the web service application to process the web service request from the API to generate a response in the native format.

12. The apparatus of claim 9, the API to receive the web service request in JSON format; and the proxy to translate the web service request into the native format.

13. The apparatus of claim 9, further comprising a schema mapping that maps a data type in the first format to a data type in the native format.

\* \* \* \* \*